(12) United States Patent
Burton et al.

(10) Patent No.: US 8,381,239 B2
(45) Date of Patent: Feb. 19, 2013

(54) METHODS AND APPARATUS FOR TRACKING USER'S REMOTE CONTROL HANDLING SIGNATURES

(75) Inventors: David Robert Burton, Skipton (GB); Martyn Ross Ward, Bingley (GB)

(73) Assignee: Eldon Technology Limited, Keighley (GB)

( * ) Notice: Subject to any disclaimer, the term of this patent is extended or adjusted under 35 U.S.C. 154(b) by 304 days.

(21) Appl. No.: 12/702,925

(22) Filed: Feb. 9, 2010

(65) Prior Publication Data

US 2011/0197214 A1    Aug. 11, 2011

(51) Int. Cl.
| | |
|---|---|
| *H04H 9/00* | (2006.01) |
| *H04N 7/16* | (2011.01) |
| *H04N 7/00* | (2011.01) |
| *H04N 5/44* | (2011.01) |
| *G06F 3/00* | (2006.01) |
| *G09B 21/00* | (2006.01) |
| *G06Q 30/00* | (2012.01) |

(52) U.S. Cl. ............ 725/13; 725/46; 348/114; 348/734; 340/4.11; 705/14.4; 705/14.49; 705/14.53

(58) Field of Classification Search ................... 725/13, 725/14, 39, 46; 348/114, 734; 340/4.11; 705/14.4, 14.49, 14.53
See application file for complete search history.

(56) References Cited

U.S. PATENT DOCUMENTS

| | | | | |
|---|---|---|---|---|
| 6,507,306 | B1* | 1/2003 | Griesau et al. | 341/176 |
| 7,260,823 | B2* | 8/2007 | Schlack et al. | 725/9 |
| 7,631,331 | B2* | 12/2009 | Sie et al. | 725/46 |
| 7,962,929 | B1* | 6/2011 | Oddo et al. | 725/21 |
| 8,046,798 | B1* | 10/2011 | Schlack et al. | 725/46 |
| 8,108,886 | B1* | 1/2012 | Murahashi et al. | 725/13 |

* cited by examiner

*Primary Examiner* — Hoang-Vu A Nguyen-Ba
(74) *Attorney, Agent, or Firm* — Seed IP Law Group PLLC

(57) ABSTRACT

Disclosed is an apparatus and method for identifying a particular user of an receiver, such as a set-top box or receiver. A user is identified by the manner in which she uses an input device, such a wireless remote. Each individual user of the receiver is assigned a profile that includes values for a number of information points that serve to distinguish the user from other users of the receiver. With a user identified through tracking of her usage of a input device, customized content such as target advertisements or programming suggestions may be provided.

20 Claims, 4 Drawing Sheets

| USER PROFILES | | |
|---|---|---|
| INFORMATION POINT 204 | USER #1 208 | USER #2 212 |
| DURATION OF TYPICAL KEY PRESS 216 | 1-2 SECS | 3-4 SECS |
| FREQUENTLY USED KEYS 220 | "EPG" | "VOL. UP" |
| TYPICAL NUMBER OF KEY PRESS REPETITIONS 224 | 2-3 | 0 |
| PREFERRED CHANNELS 228 | MSNBC | HBO |
| TYPICAL TIME OF USAGE 232 | 10:00-10:30 PM | 5:30-6:30 PM |
| TYPICAL PRESSURE ON A RESISTIVE SWITCH 236 | 2 PSI | 6 PSI |

FIG.2

METHODS AND APPARATUS FOR TRACKING USER'S REMOTE CONTROL HANDLING SIGNATURES

TECHNICAL FIELD

Implementations discussed herein are generally directed to an apparatus and method for determining an identity of a user through use of an input device.

BACKGROUND

Set-top boxes or other client devices that operate to receive satellite or cable programming may provide customized output to users. For example, a set-top box may provide targeted advertisement or a programming guide that includes a list of favorite channels. A favorite channel listing may be explicitly entered by a user on some set-top boxes. Other set-top boxes may be programmed to automatically identify commonly viewed channels and to list these channels as favorites. In such environments, a problem arises where the set-top box is used by multiple individuals, as is common in many households. Specifically, a set-top box may list a channel as a favorite that is frequently watched by some but not all of the users of the set-top box. For those users of the set-top box that do not frequently view that particular channel, a favorites list that includes the channel may appear to be inaccurate. Accordingly, it would be desirable for a set-top box or other receiver to be able to identify which of a number of different possible users is currently using the receiver. In this way, the set-top box or receiver may provide customized output that accurately reflects the true likes and needs of individual users.

SUMMARY

Implementations discussed herein are directed to an apparatus and method for identifying a particular user of an electronic device, such as a set-top box or receiver. Using the methods described herein, a user is identified by the manner in which she uses an input device, such a wireless remote. Each individual user of the receiver is assigned a profile that includes values for a number of information points that serve to distinguish the user from other user's of the receiver. Such information points may include the length of time in which the user typically holds down a key, the keys that she typically uses, and the time of day she typically uses the receiver. Other information points that may be used to identity a user are described herein. With a user identified through tracking of her usage of an input device, customized content such as target advertisements or programming suggestions may be provided.

One embodiment is directed to a method of providing customized output to a user of a receiver, comprising: receiving one or more commands at a receiver from a user input device associated with the receiver; determining data values for one or more information points based on the one or more commands; establishing one or more profiles based on the data values, each profile corresponding to a particular user; determining a current user of the user input device based on one or more recently received commands, wherein the recently received commands corresponds to one of the one or more profiles; and providing output from the receiver based on the current user of the user input device.

Another embodiment is directed to a receiver, comprising: a tuner operable to receive a program service transmission having a plurality of channels, the tuner operable to select one of the channels responsive to a signal received from an input device and to prepare the channel to be output in a data signal to a display device; a memory connected to the tuner, the memory including a tangible storage medium operable to store computer readable data and instructions, the memory storing at least one profile associated with a user, the profile having data values for a number of information points that distinguish the user's operation of the input device; and a processor operable to run computer executable code stored in the memory device, the processor operable to output user-specific data to the display device based on the user profile stored in the memory.

Still another embodiment is directed to a method of providing customized output to a user of a receiver, the method comprising: receiving a key press on a key pad associated with an input device, the key press corresponding to a command selected by a user; in response to receiving the key press, sending the command from the input device to a receiver; in response to receiving the key press, analyzing the key press to determine data on one or more information points; and in response to analyzing the key press, transmitting the data from the input device to the receiver; wherein the receiver is operable to store the data in one or more profiles that are each associated with a particular user.

BRIEF DESCRIPTION OF THE DRAWINGS

FIG. 2 is an illustration of example profiles for a first and second user;

DETAILED DESCRIPTION

Implementations discussed herein are directed to an apparatus and method for identifying a particular user of an electronic device, such as a set-top box or receiver. Using the methods described herein, a user is identified by the manner in which she uses an input device, such a wireless remote. Each individual user of the receiver is assigned a profile that includes values for a number of information points that serve to distinguish the user from other user's of the receiver. Such information points may include the length of time in which the user typically holds down a key, the keys that she typically uses, and the time of day the she typically uses the receiver. Other information points that may be used to identify a user are described herein. With a user identified through tracking of her usage of a input device, customized content such as target advertisements or programming suggestions may be provided. While the systems and methods described herein are discussed with specific reference to a set-top box or receiver, it should be understood that other implementations may be realized in other electronic devices. For example, the systems and methods described herein may be implemented in mobile or cellular phones, personal digital assistants (PDAs), digital cameras, personal computers, workstations, and the like.

As used herein, a "receiver" may be any device capable of receiving video content included in a broadcast or other program service transmission from a service provider. For example, a receiver may include a set-top box, a cable box, general purpose computer, and so on. A receiver may also include a cable modem or raster that receives streaming video. As used herein, a "service provider" may include any entity that provides a program service transmission to a receiver such as, without limitation, a satellite television distributor, a direct television provider or a cable television company. It should be understood that the term "program service transmission" generally embraces not only satellite or terrestrial broadcasts and/or narrowcasts but also transmission of information across any wired or wireless transmission medium. Accordingly, a "program service transmission" encompasses transmission of information across a cable network (for example from a cable headend to cable receiver), an Internet or other computer-accessible medium (including a local area network, wide-area network, and so on), including Internet protocol television transmissions, a wireless network such as a radio frequency or infrared network, and so on.

Figure 1:
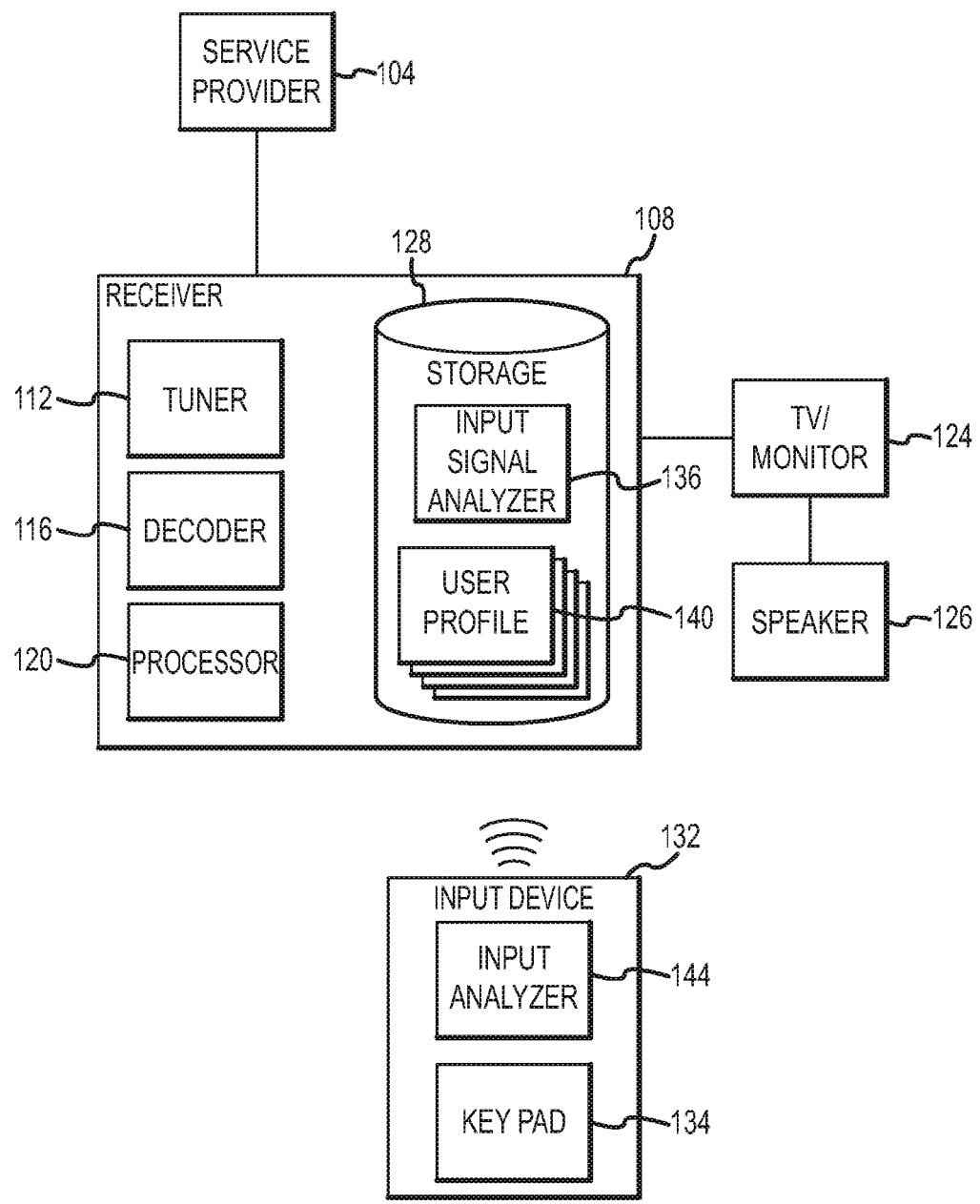
FIG. 1 is a schematic illustration of components and features associated with implementations discussed herein.

FIG. 1 is a schematic illustration of a general operating environment showing components and features of embodiments discussed herein. FIG. 1 includes a service provider 104 that transmits or otherwise provides a program service transmission to a receiver 108. The receiver 108 may be associated with or located near an individual, business or other entity, user or subscriber that receives a program service transmission from the service provider 104. The program service transmission may be received through a subscription to the service. Generally the terms "user" and/or "subscriber" refer to an individual or company who receives a program service transmission. This may include those who have purchased a subscription to the program service transmission. Additionally, the terms "user" and/or "subscriber" may refer to individuals who have been given access to the program service transmission through promotional offers and/or other non-fee-based agreements.

A receiver 108 may include a tuner 112 operable to receive the program service transmission signal from the service provider 104 and a decoder 116 to decode the received signal. The decoder 116 may be programmed to decrypt or otherwise decode some or all of the received signal in accordance with purchases and selections made by a user. In connection with embodiments that operate in the context of a satellite television service, the service provider 104 may provide a program service transmission through an uplink center. The uplink center may include a transmitter or other equipment operable to transmit a modulated signal having data representing audio and/or visual content. The modulated signal may be received at a satellite, which in turn retransmits the modulated signal to be received at one or more terrestrial locations. The retransmitted signal may be received from the satellite at one or more satellite dishes, which are typically associated with one or more receivers.

Again, it should be noted that embodiments may operate with different product transmission services. Accordingly, although a satellite system is provided as an example of a program service transmission system, it should be understood that other networks or broadcasts for transmitting data may be used by alternative embodiments. For example, embodiments may be implemented in connection with a cable service. In this case, the service provider 104 and the receiver 108 may communicate over a communication path that includes various combinations of local and wide area networks and/or the Internet. In such embodiments, the receiver 108 may be configured to access a web site, a file transfer protocol (FTP) site, a file sharing system or site, and so on.

The receiver 108 may additionally include a processor 120 operable to run executable code in connection with various functions associated with the receiver 108. For example, the processor 120 may display graphics, images, animations or other content on a TV/monitor 124, such as a television (TV) or monitor. The receiver 108 and/or the TV/monitor may be associated with a speaker 126. In the case of receiving commands or other information relating to changes to the account status, the processor 120 may be further operable to initiate or facilitate transmission of one or more messages to the service provider 104. The processor 120 may be further operable to recall and display stored content, such as a purchased or recorded videos or programs.

The receiver 108 may include or be associated with a memory or other storage device 128, such as magnetic or optical storage. The storage device 128 may be operable to store data received from the decoded satellite signal. The storage device 128 may be volatile or non-volatile memory implemented using any suitable technique or technology such as, for example, random access memory (RAM), disk storage, flash memory, solid state and so on. The storage device 128 may be located within the receiver 108 or separately from the receiver 108. The storage device may removable in nature. The stored data set may include audio and/or visual content to be transmitted and displayed through the TV/monitor 124. Generally, audio visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video. As a result commands or setting from a user, videos or other program may be stored locally in storage 128. Stored program may include for example recorded broadcasts, pay-per-view items and/or buffered portions of a live video broadcast.

The processor 120 may perform such tasks as executing commands received from a user. User commands may be sent to the receiver 108 through a user input device 156 such as remote or other wireless device. As used herein, a "user input device" may include any device operable to receive input from a user and to convey the input to the receiver 108. In one embodiment, the user input device 132 may be a hand-held device having a number of buttons or keys on a key pad 134 that when actuated by a user cause the user input device 132 covey information to the receiver 108 using a suitable communication means, such as an infrared signal. The user input device 132 may include a pointing device or functionality that allows the user to control the position of a cursor that is displayed on the TV/monitor 124. For example, the user input device 132 may include a track ball or glide plane that may be manipulated to control cursor movements. The user input device 132 may include a motion sensor or accelerometer that allows a user to control displayed items or graphics, such as a cursor, through movements of his or her hand or arm that cause a displacement of the user input device 132. It should be appreciated that other input devices such as a computer mouse or touch screen may be used and other communication means, wired or wireless, may be used. Information sent to the receiver 108 may include, for example, a command to change the displayed channel, a command to pause and/or rewind a displayed program, a command to record a particular program, a command to purchase a pay-per-view item. Commands sent to the receiver 108 may be entered through a dedicated display menu.

The storage device 128 may additionally store an application, file, module or other data that is useable by the processor 120. As used herein, an application or module includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor.

One such processor-executable application is an input signal analyzer 136, which operates to generate one or user profiles 140 from signals received from the input device 132. Each profile 140 is associated with a particular user and includes a number of information points that define a characteristic manner in which the user operates the input device 132. One such information point may be the duration of time in which a user typically holds down a key when that key is pressed on the key pad 134 of the user input device 132. This information point may be a range of time durations specified in an appropriate unit, such as seconds. It may be the case that the various users of the receiver 108 vary in the duration of time in which they typically hold down a key, and that this information point may be sufficient by itself to distinguish between the users of the device. For example, say that a first user typically holds down a key for a duration in the range of 1-2 seconds, and a second user typically holds down a key for a duration in the range of 3-4 seconds. In this instance, profiles for the first and second users may include these ranges as information points and thereby provide data to distinguish between the first and second users. If the time in which the first and second users typically hold down a key is not so clearly distinguishable, or if there are other users of the receiver 108 that typically hold down keys for a similar amount of time, the profiles 140 may include additional information points in order to properly distinguish between all users of the receiver 108. Profiles 140 having additional information points are described in greater detail below.

The input signal analyzer 136 is operable analyze signals received from the input device 132 in order to determine values or parameters for certain information points that may be used to identify a particular user. For example, when transmitting a command corresponding to a certain key press, the input device 132 may send a number of redundant command codes. One command code may be sufficient to cause to the receiver 108 to carry out the appropriate command, but several of the same codes may be sent depending on the length of time in which the user presses the key. Additionally, an input device 132 that incorporates an infrared red (IR) blaster may send a number of redundant codes so that the receiver 108 has a better chance of receiving the command. In this case, the number of redundant codes that are received may depend on the length of time in which the user holds down the key. Typically, a receiver 108 discards the redundant command codes and executes the command only once. In accordance with embodiments described herein, the redundant command codes are not discarded but rather counted or otherwise analyzed by the input signal analyzer 136 in order to infer or otherwise determine the length of time in which a key was pressed. Other operations of the input signal analyzer 136 are described herein.

In the above example, the input signal analyzer 136 measures values or parameters for an information point on a signal that is typically received from a input device 132. Using information that would otherwise be discarded by the receiver 108, the input signal analyzer 136 is able to determine information that may identify a particular user. In other embodiments, the input signal analyzer 136 may be programmed to recognize certain specialized commands or transmissions sent from the input device 132 that convey information about the manner in which a user operates the input device 132. In this regard, the input device 132 may include an input analyzer 144 that operates to measure information point values as the user presses the keys 134. In one embodiment, the input analyzer 144 may include a clock or other timing mechanism that measures a time interval that starts when the user presses a key and ends when the user releases the key. In other embodiments, the duration of the key press may be determined indirectly be measuring or otherwise analyzing certain circuit characteristics, such a switch bounce times. Once these information point values are determined, they may be sent to the receiver 108. The information point values may be sent to the receiver 108 in a transmission that includes the command that corresponds to the key that was pressed. Alternatively, the information point values may be sent in a separate command or transmission.

FIG. 2 is an illustration of two example user profiles. The first profile 208 and the second profile 212 each include values or ranges of values for an number of information points 204. The first information point 216 shown in FIG. 2 is a duration of a typical key press. The first information point 216 is described above and may, in some instances, be used by itself to distinguish between a user associated with the first profile 208 and a user associated with the second profile 212. In the example shown in FIG. 2, the user associated with first profile 208, typically holds down a key for 1-2 seconds, and the user associated with the second profile 212 typically holds down a key for 3-4 seconds. Other information points 204 may also be used to distinguish between the user associated with the first profile 208 and the user associated with the second profile 212.

The second information point 220 shown in FIG. 2 indicates a frequently used key. The key pad 134 includes a number of keys, some of which may be used preferentially by a particular user. For example, one user may prefer to scroll or "surf" through all the channels before deciding on a particular channel to view. For this user, the "channel up" or "channel down" key may be frequently used. Another user may have a favorite channel that she frequently tunes to by directly entering the channel's number. For this user, a certain number key or combination of number key may be frequently used. Referring to the example profiles shown in FIG. 2, the first profile 208 indicates that the "EPG" key is frequently used. Accordingly, in contrast to a "channel surfer," the user associated with first profile 208 may prefer to use the electronic programming guide to select a channel to view. The second profile 212 indicates that the "Volume Up" key is frequently used. Accordingly, the user associated with the second profile 212 may be hard of hearing or otherwise prefer a higher volume. The second information point 220 may be used alone or in combination with other information points to distinguish between various users of the receiver 108.

The third information point 224 shown in FIG. 2 indicates a typical number of key press repetitions. It may be the case that a particular user presses a particular key a number of times when using the input device 132 to send a single command to the receiver 108. Techniques similar to those described above in connection with the first information point 216 may be used to evaluate user behavior associated with the third information point 224. Specifically, multiple key presses that occur together may result in a group of redundant command codes being sent to the receiver 104 in a series having a number of breaks that correspond to a time when the key is not pressed. The input signal analyzer 136 may count these breaks in the series of redundant command codes to thereby count the number of times that a user repeats a key press. Similarly, in other embodiments, the input analyzer 144 associated with input device 132 may count the number of repeated key presses and transmit this information to the receiver 108 alone or in combination with the command corresponding to the key press. The third information point 220 may be used alone or in combination with other information points 220 to distinguish between various users of the receiver 108.

The fourth information point 228 indicates a preferred channel. It may be the case that a user of the receiver 108 has one or favorite channels that she typically watches. In this regard, the input signal analyzer 136 may operate to record which channel or channels a user most frequently watches. A number of criteria may be used to determine which of a number viewed channels is recorded as the user's preferred channel. In one embodiment, the channel which is viewed for the longest period of time is regarded as a preferred channel. In other embodiments, a channel that is viewed first may be regarded as a user's preferred channel. In the example shown in FIG. 2, the user associated with the first profile 208 prefers the channel "MSNBC." The user associated with the second profile 212 prefers the channel "HBO." The fourth information point 224 may be used alone or in combination with other information points to distinguish between various users of the receiver 108.

The fifth information point 232 shown in FIG. 2 indicates typical time in which the receiver 108 is used to view programming. In connection with collecting data for the fifth information point 232, the receiver 108 or the user input 132 may include a clock or other mechanism for keeping time. In the example shown in FIG. 2, the user associated with the first profile 208 has a preferred viewing time of 10:00-10:30 PM. The user associated with the second profile 212 has a preferred viewing time of 5:30-6:30 PM. The fifth information point 232 may be used alone or in combination with other information points to distinguish between various users of the receiver 108.

The sixth information point 236 shown in FIG. 2 includes a typical pressure on a key. In connection with acquiring data for the sixth information point 236, the input device 132 may have resistive switch or other pressure sensitive mechanism associated with one or more commonly used keys on the key pad 134. In this way, the input analyzer 144 may be operable to measure the pressure exerted by a user's finger when she presses a key. By way of example, the profiles shown in FIG. 2 include a 2 psi pressure typically exerted by the user associated with the first profile 208 and a 6 psi pressure typically exerted by the user associated with second profile 212. The data acquired in connection with the sixth information point 236 may be conveyed from the input device 132 to the receiver 108 alone or in combination with the command that is associated with the key press. The sixth information point 236 may be used alone or in combination with other information points to distinguish between various users of the receiver 108.

It should be appreciated that the information points 204 shown in FIG. 2 do not represent an exhaustive list of possible information points 204 useable in connection with the systems and methods described herein. Moreover, it should be appreciated that not all the information points 204 shown in FIG. 2 will be needed for every implementation. The particular information points 204 that are used to define profiles in a given system will depend on details specific to that system such as the layout of the key pad 134, the number and type of channels offered by the service provider 104, and so on. In designing a particular system, empirical data may used to determine information points 204 that provide greater variability from user to user. Those information points that tend to take on different values or ranges of values depending on which user is operating the input device may be given greater weight in defining a profile. In some embodiments numerical weights may be assigned to the information points 204 and evaluated according in determining value for distinguishing between different users.

Figure 3:
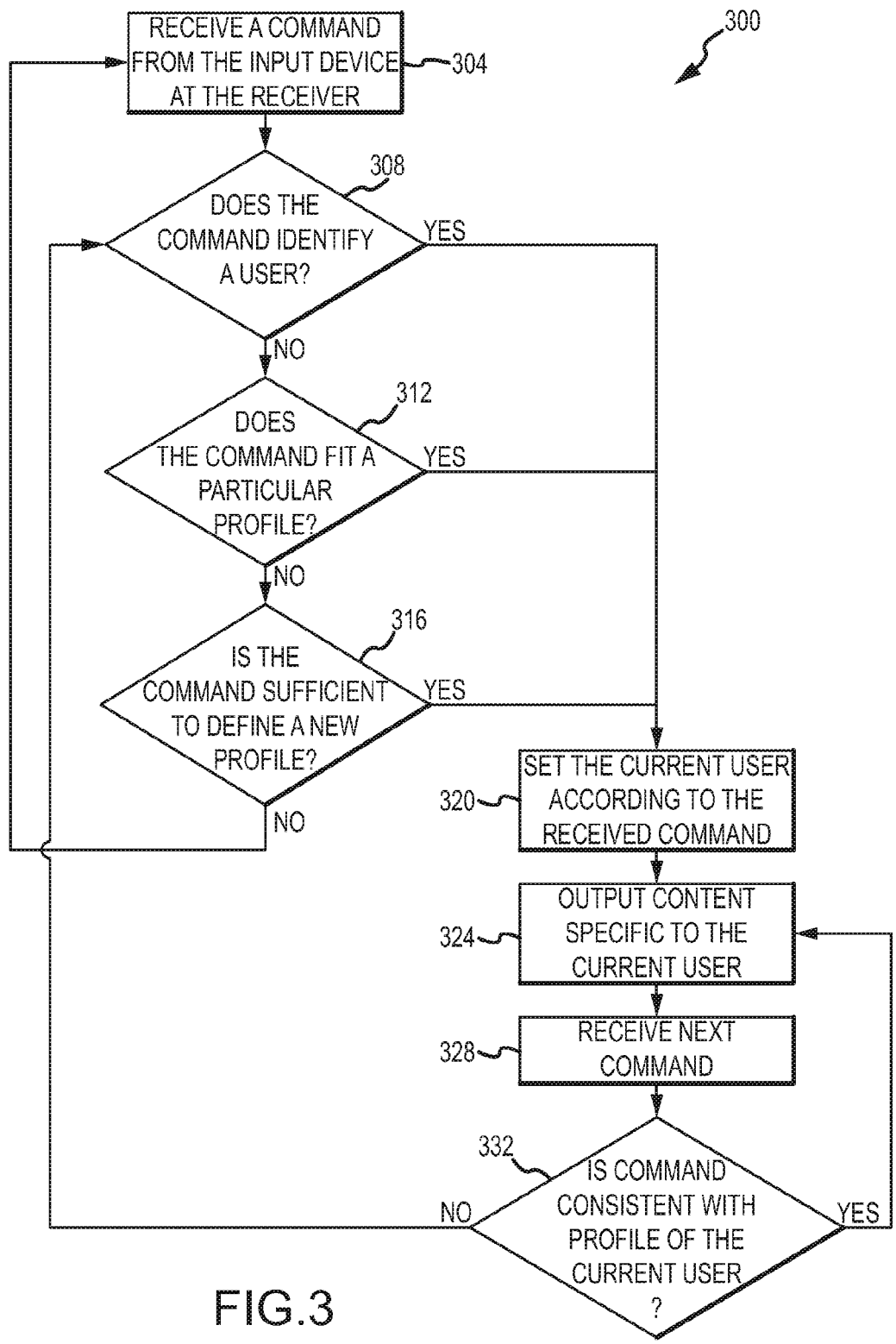
FIG. 3 is a flow chart that illustrates a method in accordance with embodiments discussed herein.

FIG. 3 is flow chart 300 that illustrates an operation of the input signal analyzer 136. As mentioned above, the input signal analyzer 136 may be an executable application running on the processor 120 associated with receiver 108. The input signal analyzer 136 is operable to generate user profiles based on signals received from the input device. Beginning at operation 304, the receiver 108 receives a command from the input device 132. Typically, the command received at operation 304 operates to at least cause the receiver 108 to take some action in connection with displaying programming content. If such a command is received in operation 304, the receiver 108 may proceed to execute the appropriate receiver action prior to any analysis of the command data to identify a particular user. For example, if the command specifies a channel change, the receiver may change the channel that is tuned by tuner 112 prior to analyzing the command to determine information about how the user operates the input device 132. In some embodiments, the command received in operation 304 may include information complied by the input device 132 for identifying user behavior or characteristics. Following operation 304, operation 308 may be executed.

In operation 308, a determination is made as to whether the command is one that explicitly identifies a user. A command that explicitly identifies a user may be received in connection with a mode of operation where the receiver 108 is "trained" to recognize a particular user. Specifically, the user may enter a command or series commands at the input device 132 that tells the receiver 108 that a particular user is currently using input device 132. In this mode of operation, the input signal analyzer 136 need not attempt to match received signal patterns to existing profiles 140 or determine if the received signals correspond to a new user. Rather, the input signal analyzer 136 may collect data for various information points and record that data in a profile 140 for the user identified by the command received in operation 304. Accordingly, if in operation 308, the command identifies a particular user, a profile 140 corresponding to that user may be created or retrieved and configured to receive data in operation 320. If, in operation 308, the command did not identify a user, operation 312 may be executed.

In operation 312, the input signal analyzer 136 determines if the command fits a particular existing profile 140. Operation 312 may include analyzing the command to determine values or parameters for one or more information points 204, such as those shown in FIG. 2. For example, the input signal analyzer 136 may count the number of repeat codes associated with the command to determine a duration of time in which the user pressed the key that resulted in the command being sent to the receiver 108. In so doing, the input signal analyzer 136 may determine a match between the current user and a stored user profile 140 based on the first information point 216. If needed, the input analyzer 136 may also look for matches on one or more additional information points 204 in order determine that a particular profile 140 corresponds to the current user of the input device 132. If, in operation 312, the input signal analyzer 136 determines that the command fits an existing profile 140, operation 320 may be executed. If the command does not fit an existing profile 140, operation 316 may be executed.

In operation 316, the input signal analyzer 136 determines if the command received in operation 304 is sufficient to define a new profile 316. Here, the current user does not match any of the existing profiles 140 and the input signal analyzer 136 attempts to acquire enough data regarding the manner in which the new user operates the input device 132 such that the data will distinguish the new user from those users associated with existing profiles 140. It should be appreciated that in determining the sufficiency for the command received in operation 304 for this purpose, the input signal analyzer 136 may use also user other data accumulated from past commands received by the receiver 108. If the received data is not sufficient in quantity or in quality to establish a distinguishing profile for the user, operation 304 may follow operation 316. Specifically, the receiver 108 awaits the next command from which the input signal analyzer 136 may acquire further data for the current user. If, however, the accumulated data is sufficient to establish a profile, operation 320 may be executed following operation 316.

In operation 320, the current user of the input device 132 is known and, accordingly, the current user's profile 340 is active. The current user may have been identified by an explicit identifying command entered into the input device 132. Alternatively, a particular user may have been recognized though data analysis that shows a correspondence with her user profile 140. In other cases, data analysis of the signals may have revealed a new user and, accordingly resulted in the establishing of a new profile 140. In this case, the user may be promoted to entered her name so that it is properly associated with the new profile. Following operation 320, operation 324 may be executed.

In operation 324, content may be output to the TV/monitor 124 or speaker 126 that is specific to the current user of the input device 132. Specifically, the receiver 108 may output programming suggestions that are tailored to the current user's likes and dislikes. The current user's likes and dislikes may be determined or inferred based on information contained in her profile 140. This may include certain information points 204 that relate to preferred programming content. Alternatively, her profile may contain a favorites listing that she has entered of that has accumulated over time. In addition to programming suggestions, the receiver 108 may also display advertisements or other promotional materials that are directed or targeted towards the current user of the input device 132.

In some instances, the person who operates the input device 132 may make channel selections that do not correspond to her personal preferences. A group of people may be present and the choices made by the user may reflect the viewing preferences of the group. By way of further example, a parent may make a channel selection for a child who will view the program or other content displayed on the TV/monitor 124. Accordingly, in operation 324, the input signal analyzer 136 may make allowances for the fact the user of the input device 132 may differ from the viewer of the program selected by use of the input device 132. The input signal 136 may take certain actions if input selections from a known user differ substantially for the user's known preferences. In one embodiment, the user input analyzer 136 may seek confirmation from the user that she is in fact the intended viewer of the selected programs or other displayed content. This confirmation may be in the form of a question in a graphical user interface provided as output to the TV/monitor 124. In other embodiments, the user input analyzer 136 may suspend displaying target advertisements or other user-specific content. Accordingly, if the user input analyzer 136 determines that the user who is operating the user input device 132 is or may not actually be the viewer of the selected program, operation 324 may be by-passed. Following operation 324, operation 328 may be executed.

In operation 328, the receiver 108 receives the next command from the input device 132. The command received in operation 328 is input by a user and may operate to cause the receiver 108 to take a particular action in connection with displaying programming, such as a channel change or a volume change. In operation 332, the command received in operation 328 is analyzed by the input signal analyzer 136. Specially, the command is analyzed to determine if it was entered by the user associated with currently active profile 140. If the command fits within the parameters or information points defined in the currently active profile, the input signal analyzer 136 may determine that the input device 132 has not changed hands and is still held by the same person. If this is the case and the input device 132 is determined to not have changed hands, operation 324 may again follow operation 332. If, however, the command received in operation 328 indicates that the input device 132 has changed hands, operation 308 may be executed. In this way, the recently received command is analyzed as described above to identify or establish a profile 140.

In some embodiments, input device 132 may be provided with certain hardware and/or programming that is operable to identify when the input device 132 changes hands. In one embodiment this may include capacitive tracker or grid associated with the exterior of the input device that discharges or is otherwise responsive to a human hand releasing the device. When such an occurrence is detected, a transmission may be sent to receiver 108 indicating that the input device 132 has changed hands.

Figure 4:
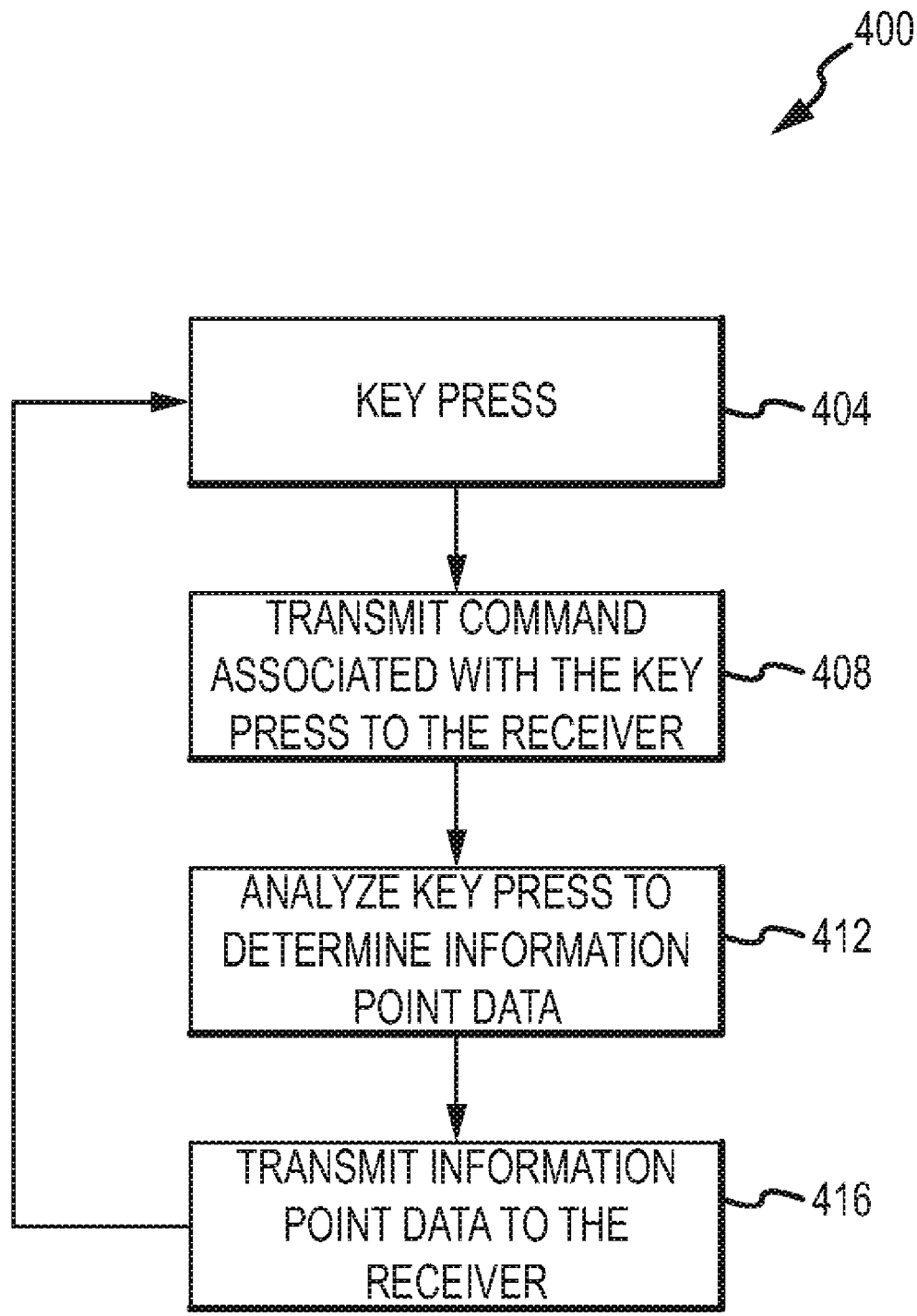
FIG. 4 is another flow chart that illustrates a method in accordance with embodiments discussed herein.

FIG. 4 is a flow chart 400 that illustrates an operation of the input analyzer 144. As mentioned above, the input analyzer 144 may run on the input device 132 and operate to analyze inputs entered by a user through the key pad 134. Initially, in operation 404, a key is press by a user. Specifically, the user enters a command to be transmitted to the receiver 108 by pressing a key on the key pad 134. The command so entered is typically one that causes the receiver to take a particular action associated with displaying programming content, such a channel change. Once the command is entered through the key pad in operation 404, the command may be transmitted by the input device 132 to the receiver 108 in operation 408. Following operation 408, operation 412 may be executed.

In operation 412, the input analyzer 144 may analyze the key press received in operation 404 to determine information point data that may be used in identifying or establishing a user profile. In one embodiment, this may include measuring the pressure on a resistive switch. In other embodiments, this may include measuring the length of time that a key remains pressed by a user when she enters a command. If, in operation 412, information point data is acquired by the input analyzer 144, this data may be transmitted to the receiver in operation 416. Following operation 416, operation 404 may again be executed.

It should be noted that the method illustrated by flow chart 400 includes analysis of key presses to acquire information point data. However, in accordance with certain embodiments, the input analyzer 144 may acquire data from other sources. For example, in one embodiment, the input device 132 is equipped with a capacitive grid that operates at or near the exterior of the device 132 and is operable to determine specific locations on the device 132 that are in contact with the user's hand. These locations may be tracked to define a characteristic manner in which the device is held by the various users. This information may be recorded and conveyed to the receiver 108 for incorporation in one or more user profiles 140.

In some embodiments, a reset feature may be provided that allows a user to clear the stored information point data out of her profile 140. Following this the input signal analyzer 136 and/or the input analyzer 144 may operate to acquire new data to thereby reestablish the user's profile 140. A user may wish to reset her profile if she discovers that the stored information point data is leading to inaccurate results. Alternatively, it may be the case that the user's characteristic manner of operating the input device 132 may changed. Such change may occur, for example, in the event that the user suffers an injury or other disabling event that alters her motor skills.

As mentioned above, the methods described herein are discussed with specific reference to a set-top box or receiver, but may be realized in other electronic devices. In one example, the methods described herein may be used to identify users of a cellular phone. A keyboard or keypad used to enter telephone numbers, text or other data into the phone may be monitored to determine characteristic ways in which a user enters data. Such data may be used to establish on or more user profiles. While a cellular phone may typically have only one user, the methods described herein may be used for security purposes. For example, if someone other than the phone's owner is using the phone, this may be detected by the profiling methods discussed herein. In response, the cellular phone may take certain actions such as requesting entry of a password, initiating a service call that reports unauthorized use of the phone, and/or disabling the phone. For cellular phones that include a capacitive grid or other mechanism for detecting touch areas, a characteristic hand position or way of holding the phone be used to identify the user for security purposes. In another embodiment, the methods described herein may be used to provide additional security for keyboards or key pads that are used to enter personal identification numbers (PINs) or other access codes. For example, if a PIN number is associated with a user profile derived from the manner in which the associated person operates a key pad, an additional level of security may be provided. Specifically, unauthorized use of a PIN number or other access code may be detected when the unauthorized person's manner of using a keyboard or keypad fails to match the profile associated with the authorized user.

The foregoing merely illustrates certain principles of embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the embodiments and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention

The invention claimed is:

1. A method of providing customized output to a user of a receiver, comprising:
   receiving one or more commands at a receiver from a user input device associated with the receiver;
   determining data values for one or more information points based on the one or more commands;
   establishing one or more profiles based on the data values, each profile corresponding to a particular user;
   determining a current user of the user input device based on one or more recently received commands, wherein the recently received commands correspond to one of the one or more profiles; and
   providing output from the receiver based on the current user of the user input device.

2. The method of claim 1, wherein each command is sent to the receiver in response to a user pressing a key on the user input device, each command including a group of identical command codes, the number of command codes corresponding to a length of time in which the key is pressed, and the receiver operating to execute the command in response to receiving a predetermined number of identical command codes, the method further comprising:
   determining data values by counting the number of identical command codes in each group of identical command codes, and recording the number of identical command codes as a first information point, the first information point indicating a length of time associated with a key press; and
   establishing one or more profiles by using the first information point to define a characteristic button press time for the user assigned to each profile.

3. The method of claim 1, wherein the user input device includes a plurality of keys, and a particular command received at the receiver corresponds to a user pressing a particular key on the user input device, the method further comprising:
   determining data values by recording which keys are pressed by a user as the first information point; and
   establishing one or more profiles by using the first information point to define a characteristic group of commonly pressed buttons for the user assigned to each profile.

4. The method of claim 1, wherein the user input device includes a plurality of keys, and a particular command received at the receiver corresponds to a user pressing a particular key on the user input device, the method further comprising:
   determining data values by recording a key press that is repeated by a user as the first information point; and
   establishing one or more profiles by using the first information point to define a characteristic key press that is repeated for the user assigned to each profile.

5. The method of claim 1, wherein the receiver is operable to provide an output signal for display of a channel, the channel received by the receiver from a program service transmission having a plurality of channels, and the commands received at the receiver operate to cause the receiver to change the channel output by the receiver, the method further comprising:
   determining data values by recording which channels remain output from the receiver for longer than a predetermined time as the first information point; and
   establishing one or more profiles by using the first information point to define a preferred channel for the user associated with each profile.

6. The method of claim 1, wherein the receiver includes a clock, the method further comprising:
   determining data values by recording a time of day in which commands are received from the user input device as the first information point; and
   establishing one or more profiles by using the first information point to define a preferred time of day for using the receiver for the user associated with each profile.

7. The method of claim 1, further comprising:
   receiving a first user command from the user input device identifying a current user of the user input device; and
   establishing a profile for the current user of the user input device by determining data values for one or more information points based on the one or more commands until a second user command is received from the user input device indicating a different user of the user input device.

8. A method of providing customized output to a user of a receiver, comprising:
receiving one or more commands at a receiver from a user input device associated with the receiver;
determining data values for one or more information points based on the one or more commands;
establishing one or more profiles based on the data values, each profile corresponding to a particular user;
determining a current user of the user input device based on one or more recently received commands, wherein the recently received commands correspond to one of the one or more profiles;
providing output from the receiver based on the current user of the user input device;
receiving a command from the user input device indicating that data values for the information points of a particular profile are no longer usable;
resetting the particular profile by discarding all of the data values associated with the information points of the particular profile; and
reestablishing the particular profile by determining data values for one or more information points based on one or more subsequent user commands until a user command is received from the user input device indicating a different user of the user input device.

9. A receiver, comprising:
a tuner operable to receive a program service transmission having a plurality of channels, the tuner operable to select one of the channels responsive to a signal received from an input device and to prepare the channel to be output in a data signal to a display device;
a memory connected to the tuner, the memory including a tangible storage medium operable to store computer readable data and instructions, the memory storing at least one profile associated with a user, the profile having data values for a number of information points that distinguish the user's operation of the input device;
a processor operable to run computer executable code stored in the memory device, the processor operable to output user-specific data to the display device based on the user profile stored in the memory; and
an input signal analyzer including instructions stored in the memory and running on the processor, the input signal analyzer operable to acquire data for one or more information points from input signals received from the input device,
wherein data acquired by the input signal analyzer is incorporated in one or more profiles stored in the memory in correspondence with a particular user, and
wherein the input signal analyzer is operable to count a number of redundant command codes received from the input device in connection with a single command, wherein the number of redundant commands codes is recorded as data for an information point corresponding to a length of time that a key is pressed.

10. The receiver of claim 9, wherein the input analyzer is further operable to acquire data for one or more information points from key presses received through a key pad associated with the input device.

11. The receiver of claim 10, wherein the data is transmitted to the receiver in a transmission that includes at least a command associated with the key presses.

12. The receiver of claim 9, wherein the user-specific data output by the processor to the display device includes a targeted advertisement.

13. The receiver of claim 9, wherein the user-specific data output by the processor to the display device includes a programming suggestion.

14. A receiver, comprising;
a tuner operable to receive a program service transmission having a plurality of channels, the tuner operable to select one of the channels responsive to a signal received from an input device and to prepare the channel to be output in a data signal to a display device;
a memory connected to the tuner, the memory including a tangible storage medium operable to store computer readable data and instructions, the memory storing at least one profile associated with a user, the profile having data values for a number of information points that distinguish the user's operation of the input device;
a processor operable to run computer executable code stored in the memory device, the processor operable to output user-specific data to the display device based on the user profile stored in the memory; and
an input signal analyzer including instructions stored in the memory and running on the processor, the input signal analyzer operable to acquire data for one or more information points from input signals received from the input device,
wherein data acquired by the input signal analyzer is incorporated in one or more profiles stored in the memory in correspondence with a particular user, and
wherein the input signal analyzer is operable to count groups of redundant command codes received from the input device in connection with a single command, wherein the number of groups of redundant commands codes is recorded as data for an information point corresponding to the number of times that a key press is repeated.

15. The receiver of claim 14, wherein the input analyzer is further operable to acquire data for one or more information points from key presses received through a key pad associated with the input device, and wherein the data is transmitted to the receiver in a transmission that includes at least a command associated with the key presses.

16. A receiver, comprising:
a tuner operable to receive a program service transmission having a plurality of channels, the tuner operable to select one of the channels responsive to a signal received from an input device and to prepare the channel to be output in a data signal to a display device;
a memory connected to the tuner, the memory including a tangible storage medium operable to store computer readable data and instructions, the memory storing at least one profile associated with a user, the profile having data values for a number of information points that distinguish the user's operation of the input device; and
a processor operable to run computer executable code stored in the memory device, the processor operable to output user-specific data to the display device based on the user profile stored in the memory, wherein
the input device includes an input analyzer provided in association with a capacitive grid disposed substantially at the exterior of the input device, the capacitive grid operable to determine as a data for an information point a location of the exterior of the input device in which a user's hand is in contact, the input device transmitting the data to the receiver for incorporation in a profile corresponding to a particular user.

17. The method of claim 16, wherein the input analyzer recording the location of the user's hand as data for an information point.

18. A method of providing customized output to a user of a receiver, the method comprising:
   receiving a key press on a key pad associated with an input device, the key press corresponding to a command selected by a user;
   in response to receiving the key press, sending the command from the input device to a receiver;
   in response to receiving the key press, analyzing the key press to determine data on one or more information points; and
   in response to analyzing the key press, transmitting the data from the input device to the receiver; wherein the receiver is operable to store the data in one or more profiles that are each associated with a particular user.

19. The method of claim 18, wherein the input device includes a timing mechanism, the method further comprising: analyzing the key press by using the timing mechanism to determine a duration of time that begins when the user presses the key and ends when the user releases the key; wherein the data transmitted from the input device to the receiver includes a measured time interval.

20. A method of providing customized output to a user of a receiver, the method comprising:
   receiving a key press on a key pad associated with an input device, the key press corresponding to a command selected by a user, wherein the input device includes a resistive switch associated with one or more keys;
   in response to receiving the key press, sending the command from the input device to a receiver;
   in response to receiving the key press, analyzing the key press to determine data on one or more information points: and
   analyzing the key press by measuring a pressure in which the user exerts on the resistive switch when the user presses the key associated with the resistive switch; wherein the data transmitted from the input device to the receiver includes the measured pressure.

* * * * *